United States Patent [19]

Merrick

[11] Patent Number: 4,800,749
[45] Date of Patent: Jan. 31, 1989

[54] TRANSDUCER CALIBRATION CIRCUIT
[75] Inventor: Edwin B. Merrick, Stow, Mass.
[73] Assignee: Hewlett-Packard Company, Palo Alto, Calif.
[21] Appl. No.: 896,992
[22] Filed: Aug. 15, 1986
[51] Int. Cl.$^4$ .............................................. G01C 25/00
[52] U.S. Cl. ......................................... 73/4 R; 73/1 B
[58] Field of Search ................ 73/1 R, 4 R, 4 D, 1 B; 323/367; 307/149

[56] References Cited

U.S. PATENT DOCUMENTS

| 3,063,283 | 11/1962 | Polansky | 73/1 R |
|---|---|---|---|
| 3,319,155 | 5/1967 | Koolman et al. | 323/367 |
| 3,439,258 | 4/1969 | Van Leeuwen | 323/367 |
| 3,463,934 | 8/1969 | Nobis | 73/1 R |
| 3,535,637 | 10/1970 | Goransson | 73/1 R |
| 3,781,869 | 12/1973 | Sudnick et al. | 73/1 R |
| 4,603,574 | 8/1986 | Norman | 73/4 R |

FOREIGN PATENT DOCUMENTS 0054661  5/1979  Japan ..................... 73/1 R

OTHER PUBLICATIONS

"Three-Point Bridge Calibration", Instrument Technology, vol. 22, No. 6, Jun. 1978.

Primary Examiner—Stewart J. Levy
Assistant Examiner—Robert R. Raevis
Attorney, Agent, or Firm—Donald N. Timbie

[57] ABSTRACT

A calibration circuit in which low valued resistors are respectively connected in series with transducer outputs and switching means are provided for connecting resistors in the circuit so as to produce a voltage across the low valued resistor that corresponds to a given value of a phenomenon applied to the transducer.

1 Claim, 1 Drawing Sheet

SIGNAL MODE

CALIBRATION MODE

– 1 –

TRANSDUCER CALIBRATION CIRCUIT

BACKGROUND OF THE INVENTION

Transducers are used to provide electrical signals corresponding to the value of a physical phenomenon such as fluid pressure or the strain in a structure. Calibration of a monitor for displaying the value of the phenomenon can be effected by setting its display to zero when the value of the phenomenon is zero and by setting its display to a given value of the phenomenon when that value is applied to the transducer. In blood pressure monitoring apparatus for example a zero setting can be made while the transducer is exposed to atmospheric pressure, and a gain setting can be made when some known pressure such as a 100 mm of Hg is applied to the transducer. As the latter is a cumbersome procedure some monitors are equipped with calibration circuits that add, to the output of a transducer when it is exposed to atmospheric pressure a voltage corresponding to a pressure that is determined by known transducer sensitivity of 5 uv/Ve/mm Hg. Ve is the operation voltage across one diagonal of a bridge circuit in the transducer that is imbalanced in accordance with the blood pressure so as to produce a fraction of Ve as the transducer output signal. Unfortunately, however, many monitors now in use do not have calibration circuits so that it is necessary to use the cumbersome procedure of applying a known pressure to the transducer.

BRIEF SUMMARY OF THE INVENTION

In accordance with this invention, a calibration circuit is provided that can be connected between the transducer output and the input of a monitor. Because of its symmetry, it does not disturb the symmetry of the bridge circuit of the transducer and does not alter the signal provided by the transducer when calibration circuit is in a signal transfer mode. When in a calibration mode, it produces an accurate calibration voltage even when the monitor amplifier to which it is coupled has a low input impedance so as to load the transducer. As the circuit is passive, no additional power is required, and in its preferred form, only a single switch contact is required to change it from a signal transfer mode to a calibration mode.

When the circuit of this invention is placed in a signal transfer mode by suitable switching means, signals at the outputs of the transducer bridge respectively flow unimpeded through low valued resistors to the inputs of the monitor amplifier, but when it is placed in a calibration mode by the switching means, the low valued resistors are connected in series with larger resistors across the excitation voltage for the transducer bridge. The values of the resistors are selected so that the portion of the excitation voltage Ve across each low value resistor is the same as the standard value e.g. 500 uv/Ve from 100 mm of Hg. Any voltage at the output of the transducer is added to the voltages across the low valued resistors. The gain control of the monitor is then set so that the monitor indicates the correct value e.g. 100 mm Hg. The zero setting of the monitor is made when the circuit is in the signal transfer mode.

In a preferred embodiment of the invention, only one switch contact is required to change the circuit from its signal transfer mode to its calibration mode. This is advantageous because if more than one switch contact is used, a failure of one contact to operate would cause the monitor to make erroneous indications that might not be recognized as such.

DETAILED DESCRIPTION OF THE INVENTION

Figure 1:
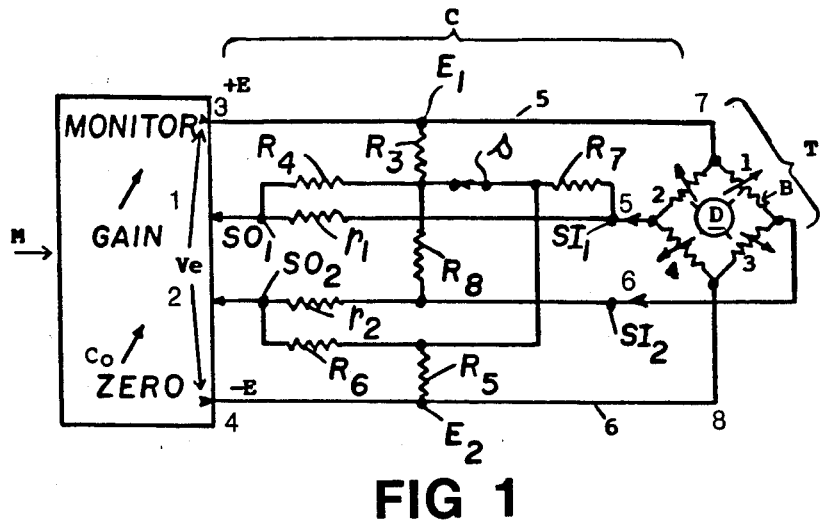
FIG. 1 is a schematic diagram of a preferred form of the calibration circuit of this invention showing its relationship to a transducer and a monitor.

In FIG. 1 a transducer T is illustrated as having a bridge circuit B comprised of four resistors 1, 2, 3, and 4 and a diaphragm D. In an actual device, the resistors are mounted on the surface of the diaphragm D so that resistors 2 and 3 change in value in one direction and resistors 1 and 4 change in the opposite direction. A monitor M supplies a positive excitation voltage $+E$ via a lead 5 to the end of one diagonal of the bridge B at the junction of the resistors 1 and 2 and an excitation voltage $-E$ via a lead 6 to the other end of that diagonal at the junction of the resistors 3 and 4. An excitation terminal $E_1$ of the circuit is connected to the lead 5, and an excitation terminal $E_2$ is connected to the lead 6. One end of the other diagonal of the bridge B at the junction of the resistors 2 and 4 is connected to a signal input terminal $SI_1$, and the other end of that diagonal, at the junction of the resistors 1 and 3, is connected to a signal input terminal $SI_2$.

A resistor $r_1$ having a small value such as ten ohms is connected between the signal input terminal $SI_1$ and a signal output terminal $SO_1$, and an identical resistor $r_2$ is connected between the signal input terminal $SI_2$ and a signal output terminal $SO_2$. The output terminals $SO_1$ and $SO_2$ are connected to the inputs of an amplifier, not shown, in the monitor M. Resistors $R_3$ and $R_4$ are connected in the order named between the excitation terminal $E_1$ and the signal output terminal $SO_1$; resistors $R_5$ and $R_6$ are connected in the order named between the excitation terminal $E_2$ and the signal output terminal $SO_2$; a switch s and a resistor $R_7$ are connected in series in the order named between the junction of $R_3$ and $R_4$ and the signal input terminal $SI_1$, and a resistor $R_8$ is connected from the junction of $R_3$ and $R_4$ to $SI_2$.

Figure 1A:
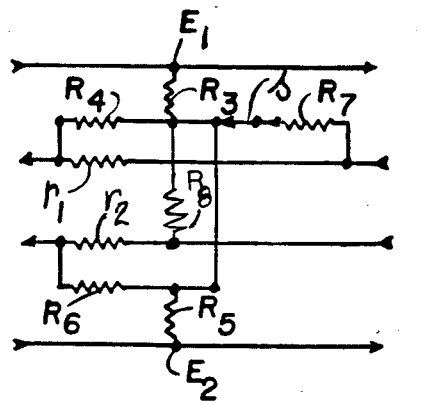
FIG. 1A shows the circuit of FIG. 1 when in a signal transfer mode.

FIG. 1A shows of FIG. 1 when the switch s is closed so as to place the circuit in the signal transfer mode. The resistors $R_4$, $R_6$, $R_7$, and $R_8$ have large values such as 10K ohms so that they have no significant effect, and the resistors $R_3$ and $R_5$ are connected in series between $E_1$ and $E_2$. Since they also have large values such as 5K ohms compared to the resistors of the bridge they do not substantially increase the load on the monitor M. Thus, the signals from the bridge B pass from the input terminals $SI_1$ and $SI_2$ to the signal output terminals respectively via the resistors $r_1$ and $r_2$.

Figure 1B:
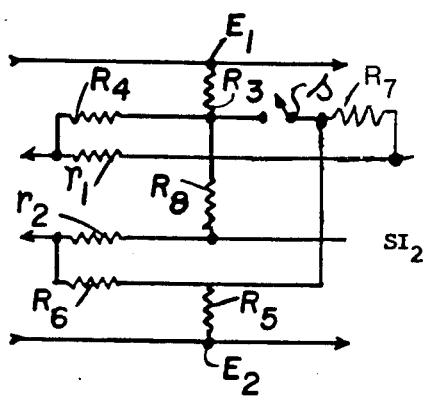
FIG. 1B shows of FIG. 1 when in a calibration mode.

FIG. 1B more clearly illustrates the operation of the circuit FIG. 1 when the switch s is open so as to place the circuit in the calibration mode. Note that the resistors $R_3$, $R_4$, $r_1$, $R_7$ and $R_5$ are connected in order between the excitation terminal $E_1$ and excitation terminal $E_2$ and that the resistors $R_5$, $R_6$, $r_2$, $R_8$ and $R_3$ are connected in order between $E_2$ and $E_1$. If $r_1$ and $r_2$ are each ten ohms and the other resistors are as previously indicated, the voltage across each of $r_1$ and $r_2$ will be 1/4000 times the excitation voltage $V_e$. The sum of these two voltages is 1/2000 of $V_e$ which is 500 uv/V of excitation in accordance with the standard for blood pressure monitors. This is the voltage for 100 mm Hg.

In operation, the phenomenon to be monitored is set to zero value, i.e. no strain if strain is being monitored and atmospheric pressure if blood pressure is being monitored. With the switch s closed as in FIG. 1A the monitor M is adjusted to indicate zer with control Co. Then the switch s is opened, as in FIG. 1B, and the gain of the monitor amplifier is set so as to indicate the value of the phenomenon determined by the resistor values. In the above example it would be 100 mm HG.

Figure 2:
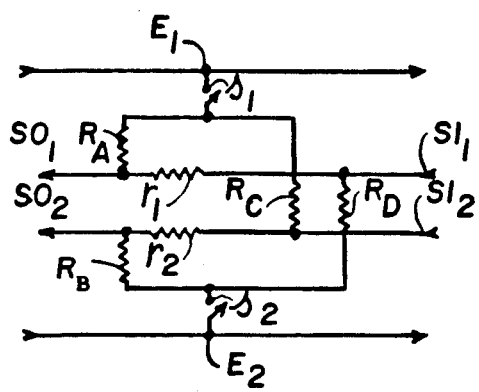
FIG. 2 is a schematic diagram of another circuit embodying the invention.

Reference is made to FIG. 2 for a description of another embodiment of the invention. Structure corresponding to FIG. 1 is designated in the same way. As in FIG. 1, $r_1$ is connected between $SI_1$ and $SO_1$ g and $r_2$ is connected between $SI_2$ and $SO_2$. A switch $s_1$ and a resistor $R_A$ are conencted in series in the order named between $E_1$ and $SO_1$; a switch $s_2$ and a resistor $R_B$ are connected in the order named btween $E_2$ and $SO_2$; a resistor $R_C$ is connected between $SI_2$ and the junction of $s_1$ and $R_A$ and a resistor $R_D$ is connected between $SI_1$ and the junction of $s_2$ and $R_B$. With $s_1$ and $s_2$ open as shown, the circuit is in the signal transfer mode in which the large resistance between $SI_1$ and $SI_2$ prevents interference wtih the operation of a bridge connected as in FIG. 1. With $s_1$ and $s_2$ closed, the circuit is in the calibration mode in which $R_A$, $r_1$ and $R_D$ are connected in series between $E_1$ and $E_2$ and $R_B$, $r_2$ and $R_C$ are connected in series between $E_1$ and $E_2$. Choice of suitable values for the resistors can produce any fraction of the excitation voltage across $r_1$ and $r_2$ for calibration.

I claim:

1. A calibration circuit for a monitor comprising a monitor having first and second input terminals to which signals to be monitored are to be applied and third and fourth terminals at which excitation voltages of opposite polarity appear, a transducer having fifth and sixth terminals at which output signals of opposite polarity appear and seventh and eighth terminals at which excitation voltages of opposite polarity are to be applied, a first resistor having a given resistance connected between said first and fifth terminals, a second resistor having said given resistance connected between said second and sixth terminals, a connection between third and seventh terminals, a connection between said fourth and eighth terminals, third and fourth resistors connected in series in the order named between said third and first terminals, fifth and sixth resistors respectively connected in the order named in series between said fourth and second terminals, a switch and a seventh resistor connected in series in the order named between the junction of said third and fourth resistors and said fifth terminal, an eighth resistor connected between the junction of said third and fourth resistors and said sixth terminal, said fourth, sixth, seventh and eighth resistors having the same resistance that is at least an order of magnitude greater than the given resistance, said third and fifth resistors having the same resistance that is at least an order of magnitude greater than said given resistance, and a connection between the junction of said fifth and sixth resistors and the junction of said switch and said seventh resistor.

* * * * *